(12) United States Patent
Beck

(10) Patent No.: US 7,823,709 B2
(45) Date of Patent: Nov. 2, 2010

(54) BELLOWS FOR HYDRAULIC, HYDROPNEUMATIC, OR PNEUMATIC PISTON-CYLINDER UNITS

(75) Inventor: Hubert Beck, Eitorf (DE)

(73) Assignee: ZF Sachs AG, Eitorf (DE)

( * ) Notice: Subject to any disclaimer, the term of this patent is extended or adjusted under 35 U.S.C. 154(b) by 316 days.

(21) Appl. No.: 10/779,290

(22) Filed: Feb. 13, 2004

(65) Prior Publication Data

US 2004/0188199 A1 Sep. 30, 2004

(30) Foreign Application Priority Data

Feb. 14, 2003 (DE) ................. 103 06 121

(51) Int. Cl.
*F16F 9/38* (2006.01)
(52) U.S. Cl. .................... 188/322.12; 267/122
(58) Field of Classification Search ............ 188/322.12, 188/312; 267/113, 122, 64.21, 64.24, 64.26, 267/64.11
See application file for complete search history.

(56) References Cited

U.S. PATENT DOCUMENTS

| | | | | | |
|---|---|---|---|---|---|
| 2,163,255 | A | * | 6/1939 | Binder et al. ........... | 188/322.12 |
| 2,458,157 | A | * | 1/1949 | Funkhouser ............. | 188/320 |
| 3,954,257 | A | * | 5/1976 | Keijzer et al. ........... | 267/64.21 |
| 4,316,604 | A | * | 2/1982 | Makita ................... | 267/64.19 |
| 4,529,213 | A | * | 7/1985 | Goodman ............... | 277/636 |
| 4,613,116 | A | * | 9/1986 | Buma .................... | 267/64.25 |
| 4,643,407 | A | * | 2/1987 | Zirk ...................... | 267/64.27 |
| 5,005,808 | A | * | 4/1991 | Warmuth et al. ........ | 267/64.27 |
| 5,080,328 | A | * | 1/1992 | Pees ...................... | 267/64.24 |
| 5,267,725 | A | * | 12/1993 | Wode et al. ............. | 267/64.27 |
| 6,007,061 | A | * | 12/1999 | Kammel et al. .......... | 267/220 |
| 6,322,058 | B1 | * | 11/2001 | Tanigawa et al. ........ | 267/64.15 |
| 6,332,602 | B1 | * | 12/2001 | Oishi ..................... | 267/122 |
| 2004/0130079 | A1 | * | 7/2004 | Gold et al. .............. | 267/64.23 |

FOREIGN PATENT DOCUMENTS

| | | | |
|---|---|---|---|
| DE | 687 859 | | 2/1940 |
| DE | 324144 | * | 8/1975 |
| DE | 3531542 | A1 * | 4/1986 |
| DE | 102 00 608 | A1 | 8/2002 |
| GB | 2096734 | A * | 10/1982 |

* cited by examiner

*Primary Examiner*—Xuan Lan Nguyen
(74) *Attorney, Agent, or Firm*—Cohen Pontani Lieberman & Pavane LLP

(57) ABSTRACT

A bellows for hydraulic, hydropneumatic, or pneumatic piston-cylinder units, especially for vibration dampers or MacPherson strut units for motor vehicles, is located between the end of a piston rod and a cylinder, and covers the part of the piston rod which projects out from the cylinder to provide protection against dirt and/or damage. An interior space of the bellows undergoes a change in volume as a result of the relative movement of the piston and cylinder. The end area of the piston rod distal from the cylinder includes at least one flow connection leading to the interior of the bellows. The flow connection allows an incoming and/or outgoing flow of air. The end area of the piston rod, i.e., the end which passes through a mounting bearing connecting the piston-cylinder unit to the body of the vehicle, is provided with a flow connection connecting the interior space of the bellows to the atmosphere.

7 Claims, 2 Drawing Sheets

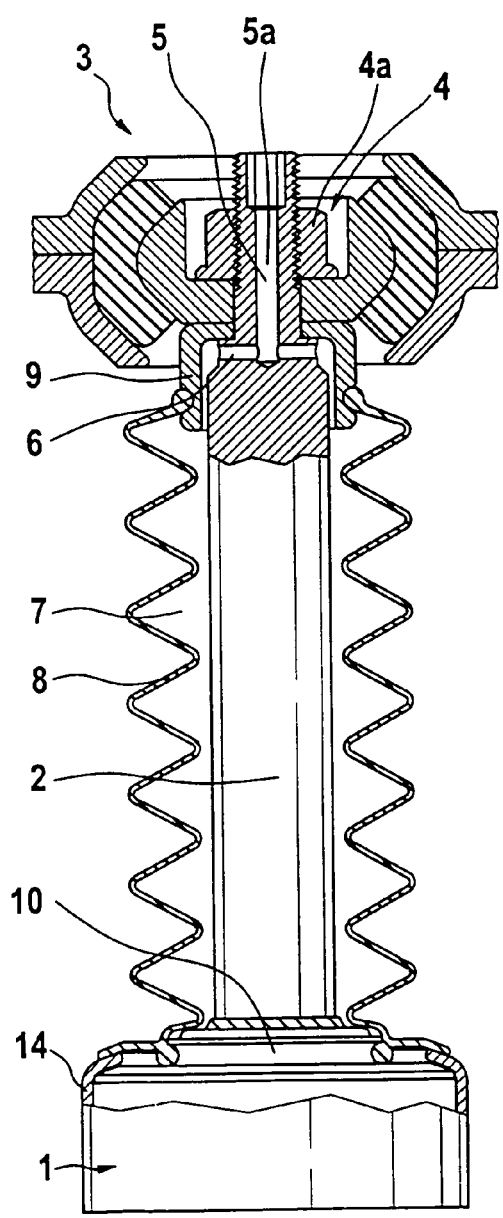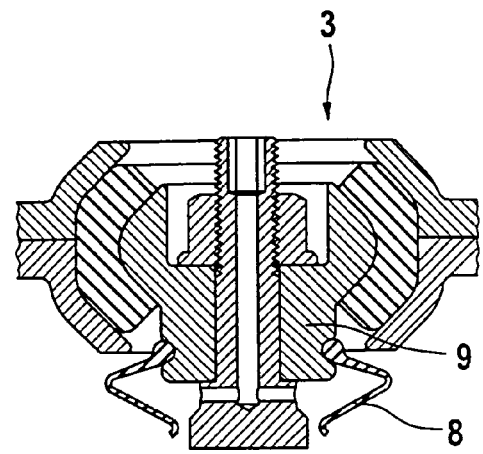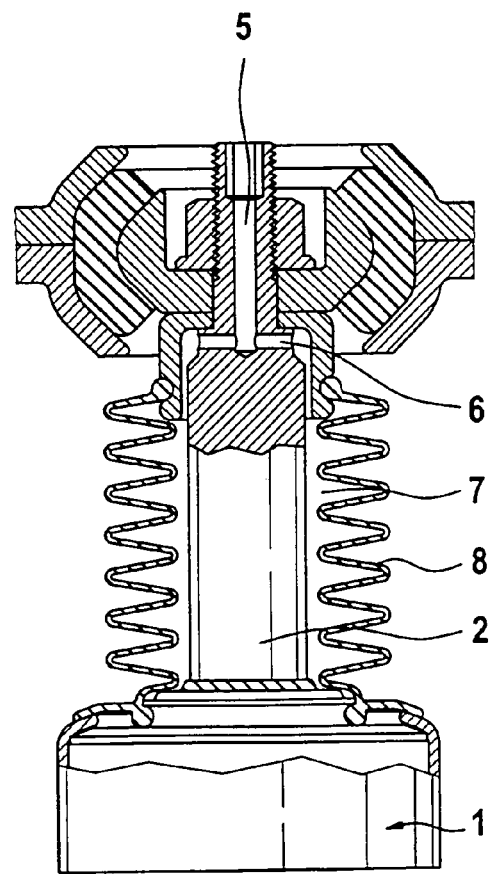
Fig.1a
Fig.1
Fig.2

BELLOWS FOR HYDRAULIC, HYDROPNEUMATIC, OR PNEUMATIC PISTON-CYLINDER UNITS

BACKGROUND OF THE INVENTION

1. Field of the Invention

The invention pertains to a bellows for hydraulic, hydropneumatic, or pneumatic piston-cylinder units, especially for vibration dampers or MacPherson strut units for motor vehicles, wherein the bellows is located between the end of the piston rod and the cylinder and covers the part of the piston rod which projects out from the cylinder to provide protection against dirt and/or damage. The interior space of the bellows undergoes a change in volume as a result of the relative movement of the parts with respect to each other and at least one flow connection leading to the interior of the bellows is provided to allow an incoming and/or outgoing flow of air.

2. Description of the Related Art

Bellows for piston-cylinder units are already known, for example, from German Patent Document DE 102 00 608 A1. In these cases, a vibration damper or a MacPherson strut unit is provided with a bellows for protection against dirt and/or damage. As a result of the relative movement between the piston rod and the cylinder, the interior of the bellows undergoes a change in volume, for which purpose an opening leading to the interior of the bellows is provided to allow air to enter and leave. Because the vibration dampers or MacPherson strut units are exposed in the wheel well of the vehicle to water spray and dirt, the use of a bellows can protect the piston rod, but, according to the state of the art, the disadvantage is that incoming air also arrives from this wheel well, and the outgoing air terminates in it.

SUMMARY OF THE INVENTION

An object of the present invention is to provide an improved bellows for hydraulic, hydropneumatic, or pneumatic piston-cylinder units such that when air is drawn in as a result of the relative movement of the bellows, only clean air is obtained, this being accomplished without any extra assembly work.

To accomplish this object, the end area of a piston rod, i.e., the end that passes to the outside through the mounting bearing connecting the piston-cylinder unit to the body of the vehicle, is provided with a flow connection connecting the interior of the bellows to the atmosphere.

The advantage of this solution is that the air enters and leaves the bellows in the end area of the piston rod. Because the flow connection passes through the mounting bearing, the air is drawn in from outside the wheel well of the vehicle. There is thus no fear of dirty air being drawn in from this area.

The flow connection from inside the bellows to the atmosphere may comprise a transverse bore in the end area of the piston rod leading to the interior of the bellows and a longitudinal bore proceeding from the transverse bore and opening to the atmosphere on the side of the mounting bearing opposite the piston-cylinder unit. Because the flow connection in the end area of the piston rod consists of a transverse bore and a longitudinal bore proceeding from it, this longitudinal bore extending all the way to the end of the piston rod, the design is very simple and therefore advantageous. Because the end area extends through the mounting bearing, the incoming air is drawn in from outside the wheel well.

The end area of the piston rod may be screwed to the attachment bearing such that the flow connection passes through the screw joint.

The bellows may be sealed and held in place appropriately by mounting at least one end of the bellows in a positive or nonpositive manner on the adjacent components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 is a cross sectional view of the upper attachment end of a piston-cylinder unit according to an embodiment of the present invention;

FIG. 1a is a cross sectional view of an area where the bellows is attached to a mounting bearing according to another embodiment of the present invention;

FIG. 2 is a cross sectional view of the piston-cylinder unit of FIG. 1 after the piston rod has traveled into the cylinder.

DETAILED DESCRIPTION OF THE PRESENTLY PREFERRED EMBODIMENTS

Figure 3:
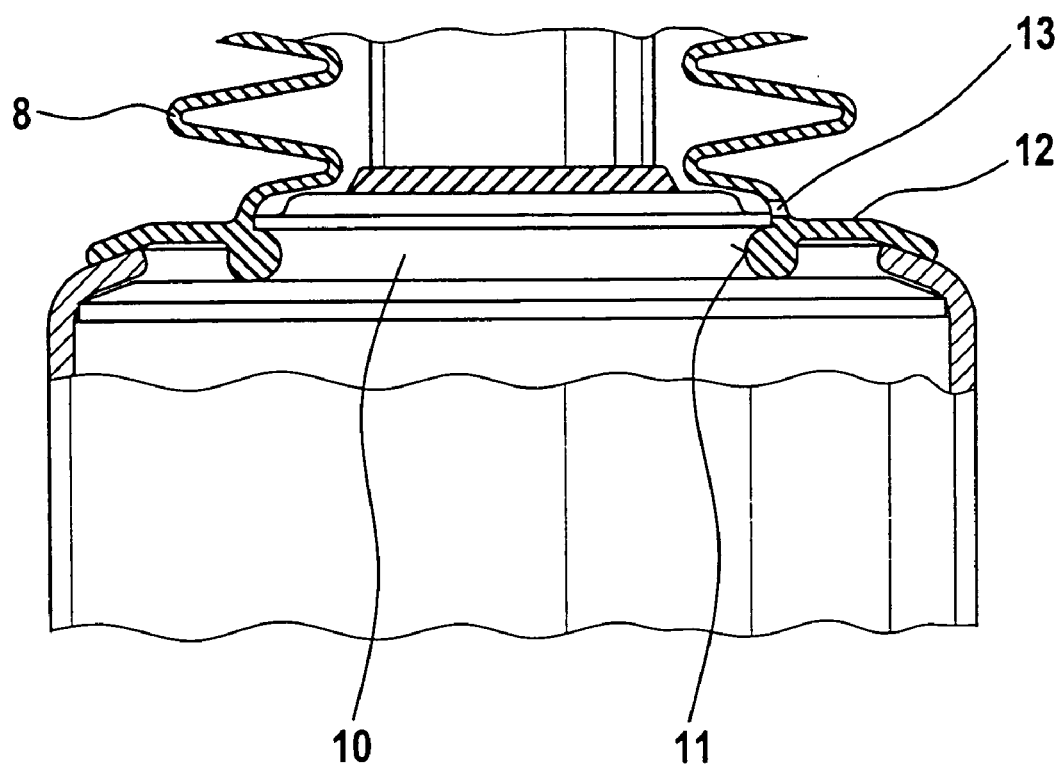
FIG. 3 is a cross sectional view of another attachment of the bellows to the piston-cylinder unit.

FIG. 1 shows a piston-cylinder unit 1 including a container tube 14 in which the individual parts (not shown in detail) of the vibration damper itself are located. A piston rod 2 projects out from this container tube 14, the upper end of the piston rod 2 extending through an upper mounting bearing 3. The upper mounting bearing 3 is attached to the body of a vehicle, whereas the lower area of the piston-cylinder unit with the piston rod 2 and the bellows 8 is located in a wheel well of the vehicle. A longitudinal bore 5a of a flow connection 5 in an upper end area of the piston rod 2 leads to the area outside the wheel well, e.g., to the area underneath the hood. The longitudinal bore 5a is connected to the interior space 7 of the bellows 8 by a transverse bore 6. Air thus escapes the interior space 7 of the bellows 8 to the outside via the transverse bore 6 and the longitudinal bore 5a of the flow connection 5, when the piston rod 2, as shown in FIG. 2, moves into the container tube 14 and the bellows 8 is thus compressed.

The upper end area of the piston rod 2 is attached to the mounting bearing 3 via a screw joint 4 with a nut 4a. In the embodiment shown in FIG. 1, an upper attachment part 9 is clamped axially between the mounting bearing 3 and the upper end area of the piston rod 2. The upper attachment part 9 has a circumferential groove which holds the bellows 8 in place by means of a bead which engages the groove. The opposite end of the bellows 8 is mounted in a lower attachment part 10 is arranged at a lower area of the piston rod 2, i.e., on the end of the container tube 14 where the piston rod 7 enters the container tube 14.

FIG. 1a shows an embodiment in which the upper attachment part 9 that holds the bellows 8 is formed directly on the inner end of the mounting bearing 3, as an integral part of it.

FIG. 3 is an enlarged view showing the connection of the lower end of the bellows 8 to the lower attachment part 10. The bellows 8 preferably consists of a rubber or rubbery material, the bellows having a bead such that the pretension of the bellows 8 allows the bead to engage with a sealing effect in a circumferential groove formed by an undercut area 11 of the lower attachment part 10. The vibration damper or the MacPherson strut unit tends to corrode in the closed off area of the container tube proximate the undercut area 11. A collar 12 is provided on the bellows 8 to protect the endangered area from intruding moisture. The collar 12 of the bellows 8 is under pretension so that it is loaded axially against the container tube 14. If necessary, a small weep hole 13 may be provided at the lowermost point of the bellows 8 to avoid the accumulation of condensate, although the main venting function continues to be performed via the flow connection 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder comprising a cylinder, a piston rod having a section projecting out of said cylinder, said section having an end arranged distal from said cylinder, said end being threadably received through a through-hole defined in a mounting bearing forming a threaded joint connecting the piston-cylinder unit to a support and such that said end projects out of a distal side of said bearing relative to said cylinder, and a bellows covering said section of said piston rod for protecting said section of said piston rod against at least one of dirt and damage, wherein an unimpeded flow connection is provided in the end of said piston rod, said flow connection comprising a transverse bore leading to the interior space of said bellows and a longitudinal bore proceeding from said transverse bore and opening outside of said bearing on said distal side of said bearing, said flow connection being permanently open and communicating freely only with an interior space defined in said bellows and with the atmosphere such that said flow connection allows a free flow of air between the atmosphere and said interior space when said interior space in said bellows undergoes a change in volume in response to a relative movement between the bearing and the cylinder, wherein the cylinder comprises a lower attachment part formed with a circumferential groove, said bellows having a bead which engages said groove, and wherein the bellows comprises a collar surrounding said bead and which extends radially from said bead, said collar having a radially outer edge portion that is loaded axially against the cylinder.

2. The piston cylinder unit of claim 1, further comprising an upper attachment part fixed to said bearing, said upper attachment part having a circumferential groove, said bellow having a bead which engages said groove.

3. The piston-cylinder unit of claim 2, wherein said upper attachment part is formed as one piece with said bearing.

4. The piston-cylinder unit of claim 1, wherein said piston-cylinder unit is one of a hydraulic, hydropneumatic, or pneumatic piston-cylinder unit.

5. The piston cylinder unit of claim 1, wherein said piston-cylinder unit is one of a vibration damper and a MacPherson strut for a motor vehicle.

6. The piston-cylinder unit of claim 1, wherein the bellows provides the only protection for the piston rod.

7. The piston-cylinder unit of claim 1, wherein the bellows is provided with a weep hole.

* * * * *